United States Patent [19]

Stine

[11] 3,853,149

[45] Dec. 10, 1974

[54] COMPOSITE TUBING

[75] Inventor: Clifford R. Stine, Bedford Heights, Ohio

[73] Assignee: Samuel Moore & Company, Mantua, Ohio

[22] Filed: June 14, 1972

[21] Appl. No.: 262,513

Related U.S. Application Data

[63] Continuation-in-part of Ser. Nos. 48,774, May 14, 1970, abandoned, and Ser. No. 44,526, June 8, 1970, abandoned.

[52] U.S. Cl. ............................................. 138/111
[51] Int. Cl. ........................................... F16l 11/12
[58] Field of Search ............ 138/111, 112, 38, 149; 174/124, 126

[56] References Cited
UNITED STATES PATENTS

| | | | |
|---|---|---|---|
| 2,577,427 | 12/1951 | McDermott et al. | 138/129 |
| 3,006,194 | 10/1961 | Greene et al. | 138/114 UX |
| 3,053,715 | 9/1962 | Labino | 138/149 X |
| 3,400,737 | 9/1968 | Matthews et al. | 138/111 |
| 3,522,413 | 8/1970 | Chrow | 138/149 X |
| 3,695,483 | 10/1972 | Pogorski | 138/149 X |

Primary Examiner—Jerry W. Myracle
Attorney, Agent, or Firm—Clelle W. Upchurch

[57] ABSTRACT

A composite tubing product having improved high temperature, low density characteristics for use in fluid sampling including at least one heat transmitting heating line and at least one heat conductive sampling line disposed in heat transfer relation with one another, a flexible thermal-barrier disposed around the lines, the thermal-barrier including one or more layers of flexible rope-like elements with the elements being comprised of substantially incombustible, inorganic materials and combustible, organic materials. A sheath of polymeric material is disposed around the thermal-barrier providing a protective cover for the tubing product.

23 Claims, 11 Drawing Figures

COMPOSITE TUBING

This application is a continuation-in-part of my co-pending U.S. applications, Ser. Nos. 48,774 and 44,526, both abandoned, filed May 14 and June 8, 1970, respectively.

BACKGROUND OF THE INVENTION

The present invention relates in general to composite tubing products, and more particularly relates to a new and improved construction for a composite tubing product for fluid sampling including the conveyance of a fluid, either liquid or gas, from one point to another, and at the same time maintaining the temperature of the conveyed fluid substantially constant.

In general, it has been known in the processing industry to use heated line constructions which employ different insulating arrangements for fluid transmission. Such type of tubing is employed in the metering and control art, such as in the chemical processing and petroleum refining industries, and is used, for example, for conveying a sample of fluid from a process line, reaction vessel or the like between instruments and/or regulators. For instance, the tubing may be used as continuous sampling instrument, for example, a chromatograph or infrared spectograph. Under these conditions, samples of fluid taken generally must be maintained at a relatively elevated temperature since the viscosity of the fluid must be kept as low as possible, and moreover in the case of a gas sample being transmitted, the sample must not be permitted to condense during transmission thereof.

In addition to good thermal insulation and heat transfer characteristics for uniform thermal fluid transmission, the tubing must possess sufficient strength and crush resistant characteristics to support and protect the transmission lines over considerable distances, and particularly when the transmission lines are buried beneath the surface of the ground. Furthermore, the tubing must possess sufficient flexibility to permit bending around corners and/or upon movement beneath the ground to reduce the necessity of additional couplings and/or fittings at the joints.

In the past, numerous insulating materials have been provided for thermal insulation, but few are suitable for high temperature applications, such as in fluid sampling, particularly at temperatures up to and in excess of 500°F. Such materials have included relatively high density forms, such as refractory cloth wraps, tapes, preformed sleeves and the like. Generally, however, such arrangements not only produce a relatively high unit flow of heat per unit weight (i.e. low insulating properties), but are expensive to produce and difficult to install, particularly for larger size installations. As to these materials, even a fewer number are suitable for such high temperature application when in a low density form and yet which maintain high insulating properties, in particular low unit heat flow per unit weight. For example, low density organic materials, such as cellulose, paper, cork, and the like, incorporate organic constituents, such as binders or the like, which are subject to thermal deterioration and/or destruction up to temperatures in excess of 500°F. Other low density materials or inorganic form, such as asbestos, glass, rock wool and the like, have generally only been provided in felted or woven forms, such as batts, mats, blankets and like masses. Oftentimes, such arrangements are not of a minimum lightweight and self-supporting construction and are generally difficult and time-consuming to install, particuarly in the fluid sampling field. In addition, such high bulk, mass-like materials do not effectively lend themselves to high speed production techniques as are required in the fabrication of relatively small diameter lines and/or pipe of indeterminate length.

Other related, but different types of fluid sampling systems are disclosed, for example, in the following patents:

528,291
903,316
1,332,314
1,661,254
2,070,861
2,186,442
2,577,427
3,269,422
3,315,703
3,400,737
627,031 (British).

SUMMARY OF THE INVENTION

A composite tubing product having improved high temperature low density characteristics for use in fluid sampling, comprising at least one heat transmitting heating line and at least one heat conductive sampling line disposed in heat transfer relation with one another, a flexible thermal-barrier disposed around said lines, said thermal-barrier including at least one layer of heat insulating rope-like elements disposed around said lines, and a sheath of polymeric material disposed around said thermal-barrier and providing a protective cover for said tubing product. The thermal-barrier includes at least two layers of rope-like elements disposed in superposed relation around said lines and beneath said protective sheath, the layers of said rope-like elements adjacent said lines being comprised of a substantially incombustible, inorganic material and the layers outwardly of said lines comprised of a substantially incombustible, inorganic material and/or of a substantially combustible, organic material From the foregoing, the following description and accompanying drawings, it will be seen that the present invention provides a new and improved construction for a composite tubing product to provide effective high temperature thermal insulation of low density, which is of a high strength, crush resistant and self-supporting construction, and which has low heat conductance in relation to the weight of the insulating material. More specifically, the invention provides a high temperature, low density composite tubing product for fluid sampling which is constructed and arranged to be effective and useful at temperatures up to and in excess of 500°F and up to 900°F. Moreover, the composite tubing product of the invention combines low density inorganic and/or organic fibrous rope-like elements arranged so that all of the components of the tubing complement one another to synergistically prevent the thermal deterioration and/or destruction of the insulating barrier and/or protective sheath thereof so as to more effectively control the transfer of thermal energy between the trace and sampling lines throughout their length thereof. Furthermore, the present invention enables materials which are generally rigid in themselves to be applied to a flexible thermal insulation construction which is very lightweight, yet which incorporates optimum strength and cushion-like crush resistant characteristics for rugged usage. Furthermore, the tubing of the invention provides a wide operating range so as to eliminate the need for costly and troublesome auxiliary equipment and results in lower jacket losses with a lighter weight as compared to known tubing products.

DESCRIPTION OF THE PREFERRED EMBODIMENTS

Figure 1:
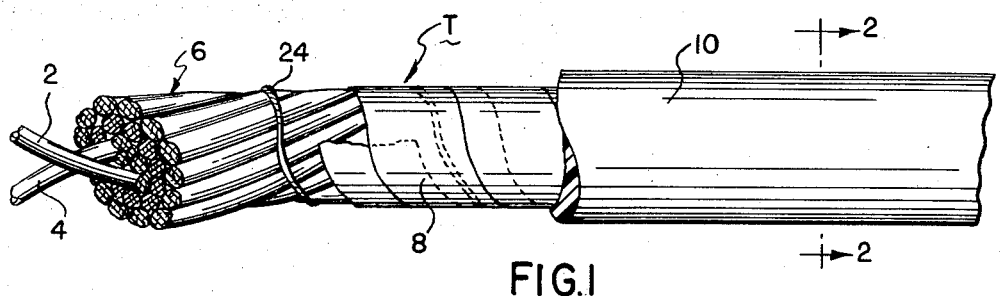
FIG. 1 is a generally perspective, fragmentary view, partially cut away, showing one form of the composite tubing made in accordance with the invention.
Figure 2:
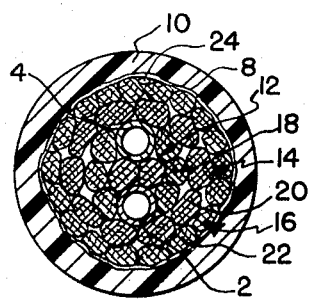
FIG. 2 is a cross-sectional view, on an enlarged scale, taken along the line 2—2 of FIG. 1.

Referring now again to the drawings, and in particular to FIGS. 1 and 2 thereof, there is shown a piece of composite tubing T which generally includes a tubular heat transmitting line 2 and a tubular heat conductive sampling line 4 disposed in heat transfer relation with one another. The lines 2 and 4 are covered or surrounded by a thermal or thermo-barrier 6 which extends throughout the length thereof. The thermal-barrier 6, in turn, is shown wrapped with a polymeric tape 8 wound tightly thereabout along the length of the barrier. The bundle thus formed is then illustrated as covered by an outer polymeric sheath 10 which provides a protective cover for the tubing product.

As shown, the heating or trace line 2 and the sampling line 4 are cabled in spiraled relation around one another so as to be in heat transfer relation for transmitting thermal energy from the heating line to the sampling line. In the invention, the heating line is preferably made from a good heat transmitting anti-corrosion metallic material, such as for instance copper or the like. The heating line is adapted to carry a heated fluid under pressure, such as steam or the like. The sampling line is preferably made from a good heat conductive material, such as stainless steel, or from a polymeric material. For example, the sampling line may be made from fluorinated hydrocarbons, such as disclosed in U.S. Pat. No. 3,400,737. In the invention, the lines 2 and 4 preferably have an O.D. in the range from about one-quarter inch to one inch. Though one heating and sampling line have been illustrated, it is to be understood that any number of heating or sampling lines may be employed, as desired. Further, it is to be understood that while the lines have been shown in a cabled or spiraled relation, the lines may extend parallel to one another or the heating line cabled around the sampling line, or vice versa, as desired. In addition, while the heating line 2 has been illustrated as being tubular for transmitting heating fluids, it is to be understood that electrical lines or wires may also be employed in accordance with the invention.

In accordance with the invention, the thermal-barrier 6 is comprised of one or more layers 12, 14 and 16 (FIG. 2) of flexible, heat insulating rope-like elements 18, 20 and 22 wound in spiral relation around the lines 2 and 4. As shown, there are three such superposed layers with the layer 12 having six elements, layer 14 having 20 elements and with layer 22 having 17 to 18 elements. Preferably, the rope-like elements in each layer are wound under a selective tension, such as up to 10 p.s.i. and preferably about 2 p.s.i. so that adjacent turns are in contiguous contact with one another along the length of the tubing product.

In the form shown, the layers, such as 12, 14 and 16, are so arranged in a specific pattern whereby they conjunctively cooperate to provide very low density thermal insulation of low weight per unit heat flow while maintaining their integrity to provide a cushion-like support for the tubing bundle. As shown, the rope-like elements of each layer are spirally wound at a predetermined angle or lay with respect to the longitudinal central axis of the tubing. Preferably, the lay at 360° is between about 2 and 20 inches of tubing length with the preferred lay being about 10 inches per length of tubing. Accordingly, it is preferred that the lay of the rope-like elements of the respective layers be substantially the same as that of the lines 2 and 4. By this arrangement, contiguous rope-like elements are prevented from moving apart and cooperate to impart good flexibility to the tubing product. In the invention, the rope-like elements themselves have a relatively large number of voids or spaces so as to contain a relatively large amount of air between the fibers. Further, the manner in which the rope-like elements are wound provides additional air spaces between adjacent elements in each layer and between adjacent elements in adjacent layers, thereby greatly enhancing the insulating effect of the thermal-barrier 6.

In the invention, though three layers have been illustrated, it is to be understood that any number of layers may be employed dependent upon the overall thickness of the insulation and/or product desired. Preferably, there are between one and eight layers per inch of wall thickness of the composite product having heating and sampling lines with an O.D. of approximately one-eighth inch to 2 inches. For example, there may be two to three layers per inch of thickness with two layers being preferred. Accordingly, the rope-like elements preferably have a diameter in the range between approximately one-eighth inch to one inch with three-eighths inch being preferred.

In the embodiment of FIGS. 1 and 2, the heating 2 and sampling lines 4 are shown with a predetermined lateral separation or spacement therebetween which may be achieved during the winding of the rope-like elements to provide the thermal-barrier shown. Accordingly, the lines 2 and 4 are held in uniformly spaced apart relation from one another throughout their length by an interleaved layer of the rope-like elements 18. Preferably, the space between the lines is between about one-eighth inch and one-half inch with about one-fourth inch being preferred. For example, with a one-fourth inch separation and a control tube temperature at the center of 500°F, the temperature at the surface of the sheath was about 150°F, the temperature immediately under the sheath about 180°F and the temperature inside the sampling line about 280°F, at 75°F. ambient temperature. By this arrangement, there is provided a good thermal heat control between the lines which retards the formation of hot-spots between the lines, and hence provides a modular heat transfer between the lines. Preferably, the respective layers 12, 14 and 16 are spirally wound in opposite directions with respect to one another. For example, the layer 12 would be spirally wound with the same lay as the line 4, the layer 14 would be spirally wound with a lay opposite to the layer 12 and the layer 16 spirally wound with a lay opposite to that of layer 14, but the same as that of layer 12. By this arrangement, the respective layers cooperate to provide a firm, high strength thermal-barrier, yet which provides optimum cushion-like characteristics for the thermal-barrier 6.

In the invention, the rope-like elements, such as 18, 20 and 22, preferably comprise low density, substantially incombustible, inorganic fibrous material, such as and including asbestos, high temperature refractory type fibers, as silica fibers and other ceramic fibers. Preferably, the elements are comprised or asbestos fibers of the type, for example, known under the ASTM designations as Commercial, Underwriters, A, AA, AAA, and AAAA which have service temperatures in the range from 400°F. to 900°F. maximum. It is preferred that the asbestos material have a minimum chlorine content so as to have no corrosive effect on the heating and/or sampling lines. In addition, it is preferred that the asbestos have a minimum content of organic materials, such as cotton and/or rayon, so as to not deteriorate at elevated temperatures. In the invention, the elements may be in the form of cordage, rovings, braided or twisted rope. Moreover, asbestos roving strands twisted to the required size and generally known as "wick packing" may be employed for the rope-like elements. As indicated, the rope-like elements are comprised of materials of relatively low densities before application to the bundle which may range from about 10 pcf. to 80 pcf. at ambient temperature, and which densities are preferably below 75 pcf. at ambient temperature and preferably in the range of 40 to 60 pcf. An important advantage of relatively high bulk, low density material is low thermal conductivity. Moreover, for a given thickness of material exposed to a given temperature difference, the rate of heat flow per unit area is directly proportional to the thermal conductivity (i.e. $k$ factor) of the material.

In accordance with the invention, the rope-like elements such as when made from asbestos fibrous materials, are preferably disposed adjacent the hot side of the tubing product. For example, this would be the side adjacent the heating and/or sampling lines as opposed to being adjacent the outer protective sheath. Accordingly, it is desirable that the thermal-barrier give good thermal insulation when the service temperature of the trace or heating line is up to and in excess of 500°F.

In the embodiment shown in FIGS. 1 and 2, the thermal-barrier 6 may be bound during the fabrication process by binder strands 24 disposed in spiraled relation about the outer layer 16 of rope-like elements 22. Preferably, the strands 24 may be comprised of one continuous strand of nylon fiber or the like, as desired.

Wrapped about the thermal-barrier 6 and the binder strands 24 is a polymeric tape layer 8. Preferably, the tape is wound with about a 25 percent overlap in the form shown. An excellent material for the tape is found to be Mylar from the E. I. du Pont de Nemours & Co., Inc. which is a polyethylene terephthalate polyester film of tough, strong characteristics, and which is impervious to the flow of moisture. Such polyester is of a very high molecular weight (about 10,000) and formed from the reaction of equal moles of ethylene glycol and terephthalic acid. Preferably, the polymeric film-like tape may have a thickness of about 0.5 mils to 10 mils with the preferred thickness being 1 mil.

In the invention, the outer jacket or sheath 10 is then provided for forming, such as by extruding or the like, the same in encompassing relationship around the taped thermal-barrier, to add to the damage and moisture resistance of the composite tubing, and prevent weathering of the composite tubing. This sheath may be formed of any suitable plastic material, such as for instance the polyvinyl chlorides, polyethylenes, polyurethanes, neoprenes, or fluorocarbons (i.e. Teflon). Preferably, the sheath has a thickness in a range from between about 10 mils to 200 mils with the preferred thickness being 100 mils.

In the invention, the composite tubing product may have an O.D., as finished, of about three-fourths inches to 6 inches with the wall thickness of the thermal-barrier being between one-eighth inches and 2 inches for a heating and/or sampling line O.D. between about one-eighth and 2 inches. For example, the ratio of the O.D. of the product to the thickness of the barrier may be 25:1 for low temperature (i.e. 100°F.) applications and 3:1 for high temperature (i.e. plus 500°F.) applications dependent on the number and/or size of the heating sampling and/or rope-like elements. For low temperature applications the ratio may be about 10:1 with the ratio for the high temperature applications being between about 2:1 to 4:1 with about 3:1 being preferred for ¼ to ⅜ inch heating and/or sampling lines. By this arrangement, the thermal-barrier 6 provides a cushion-like construction which provides adequate support for the heating and/or sampling lines and for the outer sheath so as to lend optimum bend and flexibility characteristics to the finished composition tubing product. For example, it has been found that ¼ to ½ inch tubing having a length of about 12 to 20 inches may be bent to a right angle and then returned to its normal linear condition without crimping of the outer sheath and/or impairment to the thermal insulating characteristics thereof.

Figure 3:
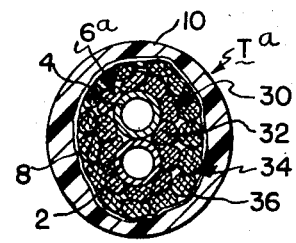
FIG. 3 is a cross-sectional view of a modified form of the composite tubing made in accordance with the invention.

In FIG. 3, there is illustrated another form of the composite tubing product, designated Ta, of the invention. In this form, however, the heating 2 and sampling 4 lines are surrounded by a first layer 30 of rope-like elements 32 which are made of the aforementioned substantially incombustible, inorganic material, such as asbestos. In this embodiment, 11 rope-like elements 32 are disposed in spiralled relation around the lines 2 and 4. As shown, the layer 30 is surrounded by another layer 34 of rope-like elements 36 which may be spirally applied with a lay opposite to that of the rope-like elements 32 of the layer 30.

In the embodiment shown, the rope-like elements 36 of the layer 34 are preferably comprised of a flexible, low density material. Preferably, the elements 36 are comprised of a combustible, organic fibrous material. For example, the elements 36 may be comprised of fibrous materials, such as jute, hemp, cotton or the like. Preferably, the elements 36 are comprised of a fibrous jute material which may be in the form of a twisted or braided construction to provide the rope. In this form, 14 rope-like elements 36 have been shown spirally wound about the layer 30 to provide the thermal-barrier 6a, as shown. In this form, however, the heating 2 and sampling 4 lines are preferably disposed in contiguous contact with one another as opposed to the controlled separation therebetween as discussed in connection with FIGS. 1 and 2. Here again, the lines 2 and 4 may be spirally disposed with respect to one another and/or in generally parallel relation, as aforesaid. In this form, the thermal-barrier 6a may similarly be covered by the spirally wound polymeric film-like tape 8 for the purposes, as aforesaid. The taped thermal-barrier may then be covered by the outer polymeric sheath 10 which provides a protective cover for the tubing product.

Figure 4:
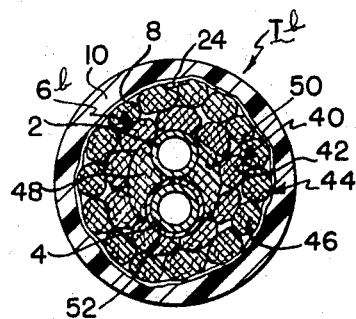
FIG. 4 is a cross-sectional view of another modified form of a composite tubing made in accordance with the invention.

In FIG. 4 there is shown a further modification of the composite tubing product, designated Tb product, of the invention. In this form, the heating 2 and sampling 4 lines are surrounded by a first layer 40 of rope-like elements 42 comprised of the substantially incombustible, inorganic material, such as asbestos, disposed in spiralled relation around the line bundle. The layer 40 is, in turn, surrounded by another layer 44 of rope-like elements 46 of the same material so as to provide the thermal-barrier 6b. As shown, the layer 40 may have nine rope-like elements 42 while the layer 44 may have 15 rope-like elements 46 to provide the construction shown.

In the form shown, however, the heating 2 and sampling 4 lines are disposed in contiguous contact with one another throughout their length and may be spirally applied and/or disposed in parallel relation, as aforesaid. In this case, the area between the outer surfaces of the lines 2 and 4 and the confronting surface presented by the layer 40 is occupied by a filler material. In this form, the filler material may comprise a pair of flexible, elongated filler elements 48 and 50 which round out and provide an additional thermal insulation between the lines 2 and 4 so as to provide good heat transfer therebetween. Preferably, the filler elements 48 and 50, for example, may be comprised of a substantially incombustible, inorganic material, such as the asbestos or the like, of the type employed for the rope-like elements of FIGS. 1 to 3.

In this form, one of the lines, such as 4, is surrounded by a protective sheath or sleeve 52 which acts as a barrier to prevent corrosive attack of the line from the material of the adjacent thermal-barrier 6b. For example, when the sampling line 4 is made from a metallic material, such as stainless steel, the barrier 52 acts to prevent corrosive attack from the asbestos material of the thermal-barrier disposed around the lines. It is then found, for example, that certain types of asbestos may contain various amounts of chlorine which may have a deleterious effect to the metallic sampling line. In the invention, the barrier 52 may be comprised of relatively thin sheet or tape materials of substantially incombustible, metallic compositions which are not affected by the temperature encountered within the tubing product. Preferably, aluminum foil or tape materials are preferred due generally to their temperature resistance, reflective characteristics, lightweight, and non-corrosiveness and the like. The metallic barrier 52 should be relatively thin to provide a lightweight structure and preferably has a thickness within the range of .5 mils to 10 mils, preferably with a thickness of 2 mils. In this form, the thermal-barrier 6b is surrounded by a polymeric tape 8 which, in turn, is surrounded by the outer protective sheath 10, as aforesaid.

Figure 5:
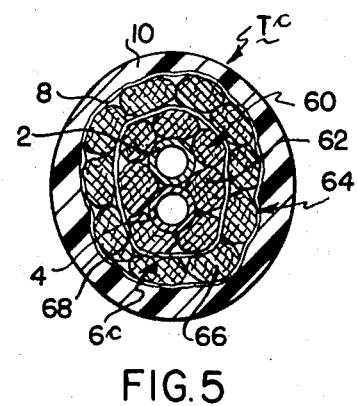
FIG. 5 is a cross-sectional view of a further modified form of the composite tubing made in accordance with the invention.

In FIG. 5, there is shown a further modification of the composite tubing product, designated Tc, of the invention. In this form, the lines 2 and 4 are surrounded by a first layer 60 of rope-like elements 62 and a second layer 64 of rope-like elements 66. As shown, the layer 60 may include seven elements 62 while the layer 64 may include 10 elements 66 to provide the thermal-barrier 6c shown. In this form, however, the layers 60 and 64 are separated by an interleaved sheet or sleeve 68 which provides an additional thermal-barrier therebetween. In this case, the barrier 68 may be comprised of a incombustible, inorganic metallic material of the type disclosed in connection with FIG. 4. In this case, the rope-like elements 62 and 66 of layers 60 and 64 may be comprised of a substantially incombustible, inorganic material, such as asbestos or the like, as described in connection with FIGS. 1 and 2. Here again, the thermal-barrier 6c may be encompassed by the spirally wrapped polymeric tape 8 which, in turn, is covered by the outer protective sheath 10 for the purposes, as aforesaid.

In the invention, it will be understood that the barrier construction, such as 52 or 68, may be applied to any of the embodiments of the invention whether the heating and/or sampling lines are in contact with one another and/or whether they are separated from one another or when the thermal-barrier is comprised solely of substantially incombustible, inorganic material or when the thermal-barrier is comprised of an inner layer of substantially incombustible, inorganic material and the outer layer comprised of substantially combustible organic material, as aforesaid.

Figure 6:
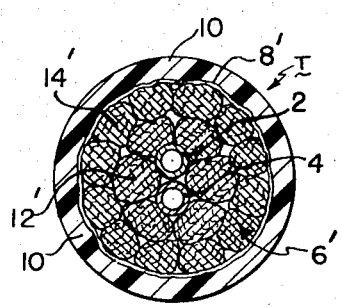
FIG. 6 is a cross-sectional view of a modification of the tubing product.

In the form of FIG. 6, the thermal-barrier 6' is comprised of an inner layer 12' of flexible, heat insulating rope-like elements cabled in spiraled relation around the lines 2 and 4. As seen in FIG. 6, there are preferably six elements in such layer having a diameter of approximately ½ inch and comprised of an incombustible, inorganic material, such as a glass fibrous material. Preferably, the outer layer 14' includes 12 rope-like elements having a diameter of approximately one-half inch and comprised of an incombustible, inorganic material, such as asbestos rope. It will be understood, that the dimensions for the rope-like elements are those prior to cabling thereof.

It is to be understood that any number of layers may be employed dependent upon the overall thickness of the tubing product. Preferably, there may be between one to eight layers per inch of wall thickness of the composite tubing product having heating and sampling lines with an O.D. of approximately one-eighth inch to 2 inches. For example, there may be two to three layers per inch of thickness with two layers being preferred. Accordingly, the rope-like elements preferably have a diameter in the range between approximately one-eighth inch to 1 inch.

Now in the invention, the rope-like elements of the layer 12' preferably comprise low density, substantially incombustible, inorganic material having good heat insulating characteristics. Preferably, the rope-like elements are comprised of high strength and high temperature fiberglas ropes which may be of braided construction. Such fiberglas material is incombustible and has good dimensional stability, and has a density up to 40 pcf. and preferably 20 to 25 pcf. with about 20 pcf. being preferred and being approximately one-half the density of the elements 14'. The melting point of the material is between about 1400°F. and 1500°F. and the material has good thermal insulation (i.e. k factor). The material has high tensile strength and resistance to moisture, oils, corrosive vapors, and most acids. In addition, the material generally will not shrink or expand and hence, has good stability at relatively high temperatures.

In this form, the rope-like elements 14' preferably comprise low density, substantially incombustible, inorganic fibrous material, such as an including asbestos, high temperature refractory type fibers, as silica fibers and other ceramic fibers. Preferably, the elements are comprised of asbestos fibers of the type, for example, known under the ASTM designations as Commercial, Underwriters, A, AA, AAA, and AAAA which have service temperatures in the range from 400°F. to 900°F. maximum. It is preferred that the asbestos material have a minimum chlorine content so as to have no corrosive effect on the heating and/or sampling lines. In addition, it is preferred that the asbestos have a minimum content of organic materials, such as cotton and/or rayon, so as to not deteriorate at elevated temperatures. In the invention, the elements may be in the form of cordage, rovings, braided or twisted rope. Moreover, asbestos roving strands twisted to the required size and generally known as wick packing may be employed for the rope-like elements. As indicated, the rope-like elements are comprised of materials of relatively low densities before application to the bundle which may range from about 10 pcf. to 80 pcf. at ambient temperature, and which densities are preferably below 75 pcf. at ambient temperature and preferably in the range of 40 to 60 pcf. An important advantage of relatively high bulk, low density material is low thermal conductivity. Moreover, for a given thickness of material exposed to a given temperature difference, the rate of heat flow per unit area is directly proportional to the thermal conductivity (i.e. k factor) of the material.

In the invention, the rope-like elements 12' such as when made from fiberglas, are preferably disposed adjacent the hot side of the product. For example, this would be the side adjacent the heating and/or sampling lines as opposed to being adjacent the outer protective sheath. By this arrangement, the material having the greatest heat insulating characteristics is disposed adjacent the hot side of the product while the more refractory material, such as the asbestos fibrous material, is disposed outwardly of the layer 12' to provide a temperature control gradient in the thermal-barrier 6'.

Disposed around the thermal barrier 6' is a polymeric tape layer 8'. Preferably, the tape is wound with about a 25% overlap. An excellent material for the tape is found to be Mylar, as aforesaid.

In the invention, the outer jacket or sheath 10' is then provided by forming, such as by extruding or the like, the same in encompassing relationship around the taped thermal-barrier, to add to the damage and moisture resistance of the composite tubing.

Figure 7:
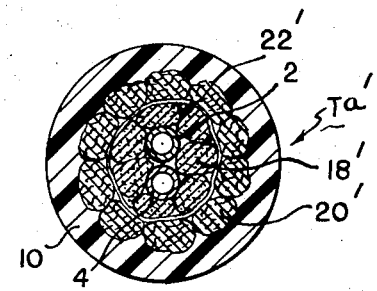
FIG. 7 is a cross-sectional view showing another modification of the tubing product.

In FIG. 7, there is illustrated another form of the tubing product, designated Ta, of the invention. In this form, the lines 2 and 4 are surrounded by a first layer 18 of seven ⅜ inch fiberglas rope-like elements which, in turn, are surrounded by an outer layer 20 of 10 ½ inch asbestos rope-like elements. In this form, however, the layers 18 and 20 are separated by an interleaved sleeve 22 which provides an additional barrier therebetween. In this case, the sleeve 22 may be comprised of an incombustible, inorganic metallic material, such as aluminum foil or tape materials which have good temperature resistance, reflective characteristics, and which are of a light-weight and non-corrosive construction. The sleeve should be relatively thin to provide a light weight structure and preferably has a thickness in the range between about 0.5 mils to 10 mils, preferably with a thickness of 2 mils. In this form, the thermal-barrier is also surrounded by an outer protective sheath 10, as aforesaid.

Figure 8:
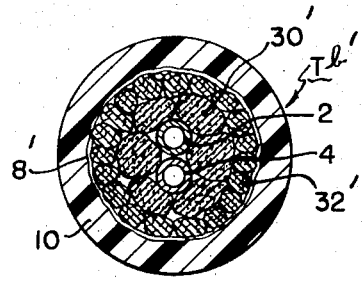
FIG. 8 is a sectional view illustrating another modification of the tubing product.

In FIG. 8, there is illustrated another modification of the tubing product, designated Tb, which includes an inner layer 30 of six ½ inch fiberglas rope-like elements disposed around the lines 2 and 4 which, in turn, are surrounded by an outer layer 32 of 19 ¼ inch organic rope-like elements. In this form, however, the layer 32 may be comprised of fibrous materials, such as jute, hemp, cotton or the like. Preferably, the rope-like elements are comprised of a fibrous jute material which may be in the form of a twisted or braided construction to provide the rope. In this form, the thermal-barrier may also be covered by a spirally wound, polymeric film-like tape 8, which, in turn, is surrounded by the outer polymeric sheath 10, as aforesaid.

Figure 9:
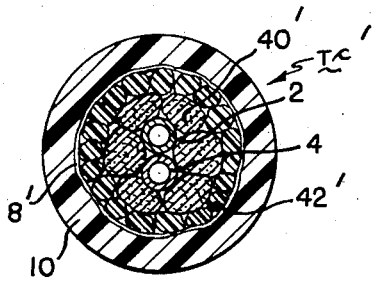
FIG. 9 is a sectional view illustrating a further modification of the tubing product.

In FIG. 9, there is illustrated another form of the tubing, designated Tc, which includes an inner layer 40 of six ½ inch fiberglas rope-like elements disposed around the lines 2 and 4 which, in turn, is surrounded by an outer layer 42 of 19 ¼ inch organic rope-like elements. In this form, the layer 42 is preferably comprised of a polymeric foam material, such as polyurethane foam material. Preferably, the foam material is of a flexible or semi-rigid construction which may be of the open or closed cell type which has good temperature resistance and heat insulating characteristics. Here again, the therma-barrier is surrounded by the polymeric film tape 8 which, in turn, is surrounded by the outer protective sheath 10.

Figure 10:
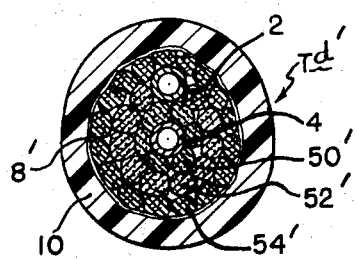
FIG. 10 is a sectional view illustrating another modification of the tubing products.

In FIG. 10, there is illustrated another modification of the product, designated generally at Td, which includes an inner layer 50 of six ¼ inch fiberglas rope-like elements cabled around the line 4. In this form, however, the lines 2 and 4 are provided with a predetermined lateral separation or spacement therebetween which may be achieved during the cabling of the rope-like elements. Moreover, the lines 2 and 4 are held in uniformly spaced apart relation by an interleaved layer 50 of rope-like elements. In this case, the layer 52 may include 10 ¼ inch fiberglas rope-like elements which, in turn, are surrounded by an outer layer 54 of 17 ¼ inch asbestos rope-like elements. Accordingly, in this form, the line 2 would be cabled together with the rope-like elements of the layer 52 around the inner layer 50 to provide the controlled separation between the lines, as shown. Preferably, the space between the lines is between about one-eighth inch and one-half inch with about one-fourth inch being preferred. By this arrangement, there is provided a good thermal heat control between the lines which retards the formation of "hot spots" and hence, provides a modular heat transfer between the lines. Here again, the layer 54 is surrounded by the film-like tape 8 which, in turn, is surrounded by the protective sheath 10, as aforesaid.

Figure 11:
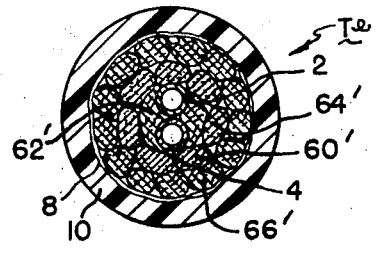
FIG. 11 is a sectional view illustrating yet another modification of the tubing product made in accordance with the invention.

In FIG. 11, there is illustrated another form of the product, designated generally at Te, wherein the lines 2 and 4 are surrounded by an inner layer 60 which comprises seven ⅜ inch fiberglas rope-like elements which, in turn, are surrounded by an outer layer 66 of 13 ⅜ inch asbestos rope-like elements. In this form, however, a pair of filler elements 62 and 64 are disposed in the space between the lines 2 and 4 and the rope-like elements of the inner layer 60. In this form, the filler elements 62 and 64 may be comprised of an inorganic, incombustible material such as the asbestos rope-like elements aforementioned. Such filler construction acts to fill out the space between the tubes so as to maintain the dimensional characteristics of the respective layers of the thermal-barrier.

By way of example and not of limitation, the following samples were constructed according to the invention, as set forth above, and were subjected to internal temperature conditions, as follows.

EXAMPLE I

A composite tubing - designated generally as Bundle No. 1 - was constructed on a Watson Cabler with the heating and sampling lines made of two copper tubes of ¼ inch diameter with a lay of 7 inches. A first layer including nine rope elements of ¼ inch diameter made from Commercial Grade asbestos with a density of 50 pcf. was wound around the tubes with a lay of 7 inches. A second layer including 15 rope elements of ¼ inch diameter jute was wound around the first layer with an opposite lay of 10 inches. Between the tubes and the first layer was disposed two filler elements of the ¼ inch diameter asbestos rope. The second layer of rope elements was then wrapped with Mylar tape of 1 mil. thickness and an overlap of 50 percent and then a sheath of polyvinyl chloride with a thickness of 80 mils was extruded around the Mylar tape. The finished composite tubing had an O.D. of 1.6 inches with an overall weight per 3 feet of 2 lbs. 5 oz.

As finished, the composite tubing was tested with internally positioned thermocouples to give a temperature profile, as follows: temperature of trace or heating line at its external surface 500° F., temperature between the first and second layers 330° F., temperature under the sheath 190° F., and external surface temperature of the sheath 175° F., all at ambient temperature. The bundle was subjected to a 4-inch radius bend in order to determine if a hot spot on the inner or outer bend radius surface was induced. After a period of 7 days no such hot spots were observed.

EXAMPLE II

A composite tubing, designated generally as Bundle No. 2, was prepared in a manner generally similar to Example I above, except that one layer of six ½ inch asbestos wick ropes (commercial grade) was cabled around two stainless steel tubes with a second layer of 14 ⅜inch jute rope cabled around the first layer together with a 0.120 inch sheath of polyvinyl chloride to provide a bundle O.D. of about 2.20 inches. The temperature profile for the bundle at control (heating line) temperatures of 300° F., 350° F., 400° F. and 600° F., respectively, at ambient temperature were, as follows:

| Sheath Temp. (At Surface) | Sheath Temp. (Under Surface) | Asbestos Temp. (Between Layers) | Sampling Temp. (Inside Tube) |
|---|---|---|---|
| 110° F | 130° F | 170° F | 258° F |
| 120° F | 140° F | 195° F | 300° F |
| 130° F | 150° F | 217° F | 342° F |
| 140° F | 165° F | 240° F | 385° F |
| 160° F | 195° F | 279° F | 474° F |

EXAMPLE III

A composite tubing, designated generally as Bundle No. 2A, was prepared in a manner generally similar to Example II, except that one layer of seven ⅜ inch asbestos wich rope (AAA grade) was cabled around two stainless steel tubes with a second layer of 13 ⅜ inch asbestos wick rope (commercial grade) cabled around the first layer together with a 0.120 inch polyvinyl chloride sheath to provide a bundle with an O.D. of approximately 2.00 inches. The temperature profile for the bundle at control (heating line) temperatures of 300° F, 350° F, 400° F and 450° F, respectively, at ambient temperature, was as follows:

| Sheath Temp. (At Surface) | Sheath Temp. (Under Surface) | Asbestos Temp. (Between Layers) | Sampling Temp. (Inside Tube) |
|---|---|---|---|
| 130° F | 150° F | 200° F | 260° F |
| 140° F | 170° F | 230° F | 305° F |
| 150° F | 187° F | 252° F | 350° F |
| 157° F | 200° F | 280° F | 395° F |

EXAMPLE IV

A composite tubing, designated generally as Bundle No. 9, was prepared in a similar manner to Example I above, except one ¼ inch copper and one ¼ inch stainless steel tubes were employed using a layer of seven ⅜ inch asbestos wick (commercial grade) rope with a Mylar wrap. In this case, for control temperatures of 300° F, 350° F and 400° F, the temperature on the sheath surface was about 140° F, 155° F and 175° F, respectively, at an ambient temperature of 75° F.

EXAMPLE V

A composite tubing, designated generally as Bundle No. 8, was made up in a generally similar manner to Example I above, except that two ¼ inch stainless steel tubes with controlled separation were provided. The thermal-barrier included a first layer of six ¼ inch asbestos wick (commercial grade) rope, a second layer of 10 ¼ inch asbestos wick (commercial grade) rope, and a third layer of 17 ¼ inch asbestos wick (commercial grade) rope. In this case, however, one of the tubes was cabled with the second layer of rope to provide the controlled separation with respect to the other tube. The tubing was found to have the following approximate control gradient profile at an ambient temperature of 75° F:

| Control Temp. (At tube center) | Sheath Temp. (At surface) | Sheath Temp. (Under Sheath) | Sample Temp. (Inside tube) |
|---|---|---|---|
| 250° F | 110° F | 120° F | 155° F |
| 300° F | 120° F | 135° F | 180° F |
| 400° F | 140° F | 160° F | 230° F |
| 500° F | 150° F | 180° F | 280° F |
| 600° F | 175° F | 215° F | 330° F |

EXAMPLE VI

A composite tubing, designated generally as Bundle No. 2, was constructed on a Watson Cabler with two ¼ inch stainless steel tubes. A first layer of seven ⅜ inch fiberglas ropes was cabled around the tubes and a second layer of 10 ½ inch asbestos ropes (Commercial Grade) was cabled around the first layer in the second pass. As finished, the tubing was electrically heated and tested with interiorly positioned thermocouples to give a temperature profile at 74° F, as follows:

| Sampling Temp. (Inside tube) | Sheath Temp. (Under surface) | Sheath Temp. (On Surface) |
|---|---|---|
| 400° F | 132° F | 120° F |
| 500° F | 152° F | 131° F |
| 600° F | 175° F | 148° F |
| 700° F | 198° F | 168° F |

EXAMPLE VII

A tubing, designated generally as Bundle No. 6, was prepared as in Example VI, except that the ¼ inch lines were cabled with a first layer of six ½ inch fiberglas ropes which, in turn, were cabled with 12 ½ inch asbestos ropes (commercial grade) in the second pass. The temperature profile at 73° F was, as follows:

| Sampling Temp. (Inside tubes) | Sheath Temp. (Under surface) | Sheath Temp. (On surface) |
|---|---|---|
| 400° F | 125° F | 110° F |
| 500° F | 145° F | 125° F |
| 600° F | 165° F | 138° F |
| 700° F | 188° F | 150° F |

EXAMPLE VIII

A tubing designated generally as Bundle No. 7, was prepared as in Example VI, except that the two ¼ inch tubes were covered with a first pass of seven ⅜ inch fiberglas ropes which in turn, were covered with a second pass of 11 ⅜ inch asbestos ropes. The temperature profile at 73° F was, as follows:

| Sampling Temp. (Inside tubes) | Sheath Temp. (Under surface) | Sheath Temp. (On surface) |
|---|---|---|
| 300° F | 124° F | 110° F |
| 400° F | 150° F | 125° F |
| 500° F | 175° F | 145° F |
| 600° F | 195° F | 160° F |

In the invention, while the protective sleeve 52 (FIG. 4) has been illustrated as being disposed around one of the lines, it is to be understood that such sleeve may be disposed around either one or both of the lines, as desired. Moreover, the sleeve may be made of aluminum, copper or other foil-like materials which not only act as a vapor barrier, but which provide a conductive media to aid and provide a uniform heat transfer between the lines. In addition, while the lines have been described as being in parallel and/or spaced relation with respect to one another, it will be understood that either line may be disposed in generally axial or generally concentric relationship with respect to one another. For example, the heating line may be disposed within the sampling line or vice versa to achieve the temperature control, as desired.

From the foregoing and accompanying drawings, it will be seen that the present invention provides an improved and novel construction for a composite tubing product which provides optinium insulation characteristics with low density and yet which provides a firmness with cushioning or shock impact resistance not obtainable with other types of constructions or similar purposes. Moreover, relatively large size tubings can be quickly produced and at reduced costs, as compared to high density tape wraps, for example. Importantly, the invention incorporates those and other advantages, and further provides a controlled temperature gradient construction which maximizes a uniform heat transfer between the heating and sampling lines while reducing heat transfer to the outer sheath to prevent degradation and/or deterioration of the outer protective cover for the product. For example, for trace or control line temperatures in excess of 500° F to 700° F and up to 900° F, it has been found that the temperature on the sheath surface can be maintained at about 175° F to 180° F at 75° F ambient temperature. This would give a temperature under the sheath of about 200° F to 210° F at an ambient temperature of 100° F which is near the continuous temperature rating of the outer (vinyl) sheath. In addition, while the lines have been described as being in parallel and/or spaced relation with respect to one another, it will be understood that either line may be disposed in generally axial or generally concentric relationship with respect to one another. For example, the heating line may be disposed within the sampling line or vice versa to achieve the temperature control, as desired.

I claim:

1. A composite tubing bundle of indeterminate continuous length of bendable, high strength construction with improved cushion-like, and crush resistant characteristics and controlled low-heat conductance per unit of insulation at service temperatures in excess of 500°F. for maintaining a conveyed fluid sample at constant elevated temperature comprising, at least one tubular sampling line having an O.D. in the range of one-eighth inches to 2 inches for conveying fluid therethrough, at least one heat transmitting trace line disposed in heat transfer relation along the length of said sampling line, a flexible thermal-barrier of high bulk, low density, and self-supporting material disposed in controlled insulating relation with respect to said lines to provide a thermal temperature control gradient to maximize a uniform heat transfer between the lines and to minimize heat transfer to the exterior of the bundle, said thermal-barrier having an inner layer including a plurality of individual, continuous rope-like elements cabled together in spiraled relation around said lines with a lay at 360° of 2 inches to 20 inches per length of tubing, said rope-like elements being made from an inorganic, substantially incombustible fibrous material having a density less than 80 pcf. at ambient temperature, at least one other outer layer disposed in encompassing relation around said inner layer, said outer layer including a plurality of individual, continuous rope-like elements made from a heating insulating material cabled together around said outer layer and disposed in spiraled relation generally opposite to that of rope-like elements of said inner layer in relation to the longitudinal axis of said bundle, the thermal-barrier having between two and eight of said layers per inch of wall thickness of the composite bundle with the rope-like elements having a diameter, untensioned, approximately ⅛ inch to 1 inch, a sheath of extruded polymeric material disposed around said outer layer and having a smaller wall thickness as compared to the thickness of said thermal-barrier and coacting with the thermal-barrier to provide a cushion-like, self-support for the heating and sampling lines, said tubing bundle, as finished, having an O.D. in the range of ¾ inches to 6 inches, the ratio of the O.D. of said bundle to the wall thickness of said thermal-barrier being in the range from 2:1 to 4:1 to provide a cushion-like, yet bendable self-support for the heating and sampling lines, and said thermal-barrier providing a thermal temperature gradient beneath the sheath sufficient to maintain said sheath substantially at its continuous temperature rating for trace line temperatures in excess of 500°F.

2. A composite tubing bundle in accordance with claim 1, including,
a tape of polymeric material disposed in wrapped relation around said outer layer to hold the rope-like elements of said layers together in the form of a composite bundle beneath said sheath.

3. A composite tubing bundle in accordance with claim 1, including,
a flexible thermal-separation layer defined by said inner layer being disposed around one of said lines and the outer layer being wrapped with the other line around said inner layer for maintaining said lines in spaced separation from one another, and
said separation layer including a flexible rope-like element made of a substantially incombustible, inorganic material.

4. A composite tubing product in accordance with claim 3, wherein
said thermal-barrier includes a plurality of layers of heat insulating rope-like elements disposed in superposed relation around said separation layer beneath said protective sheath.

5. A composite tubing product in accordance with claim 4, wherein
certain of the layers of the rope-like elements of said thermal-barrier are comprised of a substantially incombustible, inorganic material, and
others of the rope-like elements of said layers being comprised of a substantially combustible, organic material.

6. A composite tubing product in accordance with claim 4, wherein
all of said layers of said thermal-barrier are comprised of a substantially incombustible, inorganic material.

7. A composite tubing product in accordance with claim 1, wherein
the rope-like elements of certain of the outer layer of said thermal-barrier are comprised of substantially incombustible inorganic materials, and
others of the rope-like elements of said layers being comprised or substantially combustible organic materials.

8. A composite tubing product in accordance with claim 1, wherein
the rope-like elements of said inner layer are comprised of fibrous asbestos materials.

9. A composite tubing product in accordance with claim 1, wherein
the rope-like elements of said inner layer are comprised of fiberglas material.

10. A composite tubing product in accordance with claim 1, wherein
the rope-like elements of said outer layer are comprised of fibrous jute materials.

11. A composite tubing product in accordance with claim 1, wherein
said heating line is comprised of a metallic material, and including a sleeve-like member disposed around said heating line.

12. A composite tubing product in accordance with claim 1, including a flexible fluid impervious sleeve-like metallic foil member disposed between at least one pair of adjacent layers of said thermal-barrier.

13. A composite tubing product in accordance with claim 1, wherein
said lines are spirally wrapped in contiguous heat transfer relation with respect to one another.

14. A composite tubing product in accordance with claim 13, wherein
said rope-like elements of said inner layer are spirally wrapped in complemental heat insulating relation with respect to said lines.

15. A composite tubing product in accordance with claim 1, wherein
one of said lines is spirally wrapped in continuous heat transfer relation around the other of said lines.

16. A composite tubing product in accordance with claim 15, wherein
said rope-like elements of said inner layer are spirally wrapped in generally complemental heat insulating relation around said lines.

17. A composite tubing product in accordance with claim 1, wherein
one of said lines is disposed in generally concentric relation within the other of said lines.

18. A composite tubing product in accordance with claim 1, including
a heat conductive sleeve-like member disposed around at least one of said lines.

19. A composite tubing product in accordance with claim 18, wherein
said sleeve-like member is made of a metallic foil material wrapped in overlapping relation around at least one of said lines.

20. A deformable composite tubing bundle of indeterminate continuous length of bendable, high strength construction with improved cushion-like, and crush resistant characteristics and controlled low-heat conductance per unit of insulation at service temperatures in excess of 500°F. for maintaining a conveyed fluid sample at a substantially constant elevated temperature comprising,
at least one tubular sampling line having an O.D. in the range of ⅛ inches to 2 inches for conveying fluid therethrough,
at least one metallic heat transmitting trace line disposed in heat transfer relation along the length of said sampling line,
a flexible thermal-barrier of high bulk, low density, and self-supporting material disposed in controlled insulating relation with respect to said lines to provide a thermal temperature control gradient to maximize a uniform heat transfer between the lines and to minimize heat transfer to the exterior of the bundle,
said thermal-barrier having an inner layer including a plurality of individual, continuous rope-like elements cabled together in spiraled relation around said lines with a lay at 360° of between 2 inches and 20 inches per length of tubing,
said rope-like elements being made from fibrous materials selected from the group comprising essentially asbestos and fiberglas having a density less than 80 pcf. at ambient temperature,
at least one other layer disposed in encompassing relation around said inner layer,
said outer layer including a plurality of individual, continuous rope-like elements made from asbestos having a density less than 80 pcf. cabled together around said outer layer and disposed in spiraled relation generally opposite to that of rope-like elements of said inner layer in relation to the longitudinal axis of said bundle,
the thermal-barrier having between two and eight of said layers per inch of wall thickness of the composite bundle with the rope-like elements having a diameter, prior to application, between approximately one-eighth inch and 1 inch,
a sheath of extruded polymeric material disposed around said outer layer and having a smaller wall thickness as compared to the thickness of said thermal-barrier and coacting with the thermal-barrier to provide a cushion-like, self-support for the heating and sampling lines,
said tubing bundle, as finished, having an O.D. in the range of three-fourths inches to 6 inches,
the ratio of the O.D. of said bundle to the wall thickness of said thermal-barrier being in the range of 2:1 to 4:1 to provide a cushion-like, yet bendable self-support for the heating and sampling lines, and
said thermal-barrier providing a thermal temperature gradient beneath the sheath sufficient to maintain the outer surface of the sheath at approximately 175°F to 180°F at ambient temperature so as to maintain the sheath substantially at its continuous temperature rating for trace line temperatures in excess of 500°F.

21. A composite tubing bundle having improved high temperature, low density characteristics adapted for use in fluid conveyance, said product comprising at least one heating line and at least one sampling line having heat conductive walls disposed in heat transfer relation with one another; a flexible thermal barrier disposed about said lines having a density of less than 80 pcf. and consisting of at least one inner layer of wound heat insulating rope-like material and at least one outer layer of wound heat insulating rope-like material disposed about the inner layer; the rope-like material of the inner layer having greater heat insulating properties than that of the outer layer, and a sheath of polymeric material providing a protective cover for the product.

22. The composite tubing bundle of claim 21 wherein the said inner layer of heat insulating material is rope-like fiberglass spirally wound about the said lines and the outer layer is spirally wound rope-like asbestos.

23. A composite tubing product having improved high temperature, low density characteristics for use in fluid sampling, said tubing product comprising
a sheath of polymeric material which is substantially circular in cross-section;
at least one heat transmitting heating line and at least one tubular heat conductive sampling line disposed in heat transfer relation with one another and disposed along the longitudinal axis of the composite tubing product; and
a flexible thermal-barrier material which is effective as a heat insulator at temperatures of 500°F. and above, said thermal barrier material substantially completely filling the space between the said lines and said sheath and supporting the said lines in the composite tubing product, said thermal-barrier material being a heat insulating rope-like incombustible inorganic material and having a density of less than 80 pcf.

* * * * *